US011039494B2

(12) United States Patent
Pawar

(10) Patent No.: US 11,039,494 B2
(45) Date of Patent: Jun. 15, 2021

(54) BASE STATION SLEEPING CELL RECOVERY

(71) Applicant: T-Mobile USA, Inc., Bellevue, WA (US)

(72) Inventor: Swapnil Jijaba Pawar, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/538,675

(22) Filed: Aug. 12, 2019

(65) Prior Publication Data

US 2021/0051751 A1 Feb. 18, 2021

(51) Int. Cl.
*H04W 76/18* (2018.01)
*H04L 12/24* (2006.01)
*H04L 29/08* (2006.01)
*H04W 76/15* (2018.01)
*H04W 68/00* (2009.01)
*H04W 88/06* (2009.01)

(52) U.S. Cl.
CPC ......... *H04W 76/18* (2018.02); *H04L 41/0668* (2013.01); *H04L 67/12* (2013.01); *H04W 68/005* (2013.01); *H04W 76/15* (2018.02); *H04W 88/06* (2013.01)

(58) Field of Classification Search
CPC ... H04W 76/18; H04W 76/15; H04W 68/005; H04W 88/06; H04W 24/02; H04W 52/241; H04W 24/04; H04W 16/06; H04W 72/0406; H04L 41/0668; H04L 67/12; H04L 43/0888; H04L 41/12; G06F 9/541
See application file for complete search history.

(56) References Cited

U.S. PATENT DOCUMENTS

2010/0254274 A1* 10/2010 Westerberg ........... H04W 24/02
370/252
2014/0171063 A1* 6/2014 Mori .................... H04W 52/241
455/424
(Continued)

FOREIGN PATENT DOCUMENTS

CN         105611558 A  *  5/2016
CN         110635567 A  *  12/2019
(Continued)

OTHER PUBLICATIONS

GSM Association, Official Document CLP.29—LTE-M Deployment Guide to Basic Feature Set Requirements, p. 33, Apr. 5, 2018 Version 2.0 (Year: 2018).*

(Continued)

*Primary Examiner* — Phirin Sam
*Assistant Examiner* — Louis Samara
(74) *Attorney, Agent, or Firm* — Perkins Coie LLP

(57) ABSTRACT

The disclosed technology provides a system and method for detecting and recovering from sleeping cell failures in radio cells of wireless wide area communication network by periodically communication with a remote server/host using the radio access network of a radio cell to be monitored for sleeping cell problems, and autonomously or manually resetting or rebooting the radio cell upon determining that failure to reach the remote server/host is a result of the radio cell going into a sleeping cell state.

28 Claims, 5 Drawing Sheets

(56) References Cited

U.S. PATENT DOCUMENTS

| | | | | |
|---|---|---|---|---|
| 2015/0172939 A1* | 6/2015 | Huang | ............... | H04L 43/0888 |
| | | | | 370/241 |
| 2015/0181446 A1* | 6/2015 | Sandberg | .............. | H04W 24/04 |
| | | | | 370/328 |
| 2015/0257095 A1* | 9/2015 | Sun | ................... | H04W 72/0406 |
| | | | | 370/311 |
| 2017/0235585 A1* | 8/2017 | Gupta | ..................... | H04L 41/12 |
| | | | | 718/1 |
| 2018/0183889 A1* | 6/2018 | Meriac | .................... | G06F 9/541 |
| 2018/0206125 A1* | 7/2018 | Maguire | .............. | H04W 16/06 |

FOREIGN PATENT DOCUMENTS

| | | | | |
|---|---|---|---|---|
| WO | WO-2017039757 A1 * | 3/2017 | ............ | H04W 48/16 |
| WO | WO-2020117105 A1 * | 3/2018 | | |
| WO | WO-2020117105 A1 * | 6/2020 | ............ | H04W 24/04 |

OTHER PUBLICATIONS

IoTNow, Rugged 4G LTE dual-SIM VPN m2M router luanched by China's Robust Technologies, Apr. 2, 2013. (Year: 2013).*

* cited by examiner

BASE STATION SLEEPING CELL RECOVERY

BACKGROUND

Cell outage or radio network failure can be caused by a variety of reasons including hardware or software/firmware failure in the radio and baseband modules, site power failures, network connectivity failures, configuration errors, etc. Because network performance and robustness are critical for mobile operators, operators have developed operations support system (OSS) functions to detect (and often automatically correct) cell outage failures and network performance degradation. OSS systems typically detect cell outage and network degradation by monitoring performance counters or alarms and other key process indicators (KPIs) provided by the base station and network equipment. However, there is a pernicious kind of cell service failure or degradation known as a sleeping cell (or sleepy cell) that results in network performance degradation or failure without being easily detectable by OSS systems.

Because sleeping cells can render network services unavailable without causing anomalous KPIs or triggering alarms as do other kinds of cell failures, these cells are generally invisible to the network operator while affecting user quality of experience (QOE). For example, the sleeping cell can result from a random-access channel (RACH) failure due to RACH misconfiguration, or software/firmware failure at the eNB leading to an inability of the cell to serve any new users while continuing to serve existing users (until at least a UE requires cells reconfiguration or new timing advance). This is especially problematic because blocked users may not know to report the issue (e.g. because they can connect to a different and perhaps lower performance cell). In other sleeping cell failures, the cell may be completely locked up and unable to handle any traffic. The network operator or service provider may not know there is a problem until cellular subscribers start to call in the problem, which may be several hours later. The loss of possibly several hours between when the sleeping cell problem first arises and when the network operator becomes aware of it and manually resets the cell to resolve the issue is particularly bad given the fierce competition for cellular subscribers and the need to maintain exceptional QOE. It is therefore beneficial to have a system that can promptly detect and automatically or autonomously recovery from sleeping cell problems.

DETAILED DESCRIPTION

The disclosed technology provides systems and methods for recovering from sleeping cell failures in wireless wide area network (WWAN) radio communication systems. The disclosed technology includes an Internet of Things (IoT) module (e.g., an IoT sensor and controller device) that monitors a cell for entry into a sleeping cell state, and upon detection of entry into a sleeping cell state, resets the cellular radio cell. Resetting the cell reboots the internal processors to recover from the locked condition caused by the sleeping cell state. Powering on the IoT device initiates a connection request to the cellular radio cell to be monitored, and if the connection is successful, the device downloads (or redownloads) configuration parameters for use in monitoring the radio cell. The IoT device then attempts to connect to a remote server or host using the monitored cell (e.g., by sending a ping request to the remote server/host). If the IoT device manages to reach the remote server/host, it waits for a delay that is programmed/configured from the downloaded configuration parameters and attempts to reach the remote server/host again. This repeated reachability test confirms that the monitored cell is alive. If the IoT device is unable to reach the remote server/host after several retries programmed/configured from the downloaded settings, it concludes that cell is in a sleeping cell state (particularly when other performance metrics are okay, and no alarms have been triggered to otherwise indicate a problem). The IoT device then initiates a cell reset to recover from the sleeping cell error.

Various embodiments of the invention will now be described. The following description provides specific details for a thorough understanding and an enabling description of these embodiments. One skilled in the art will understand, however, that the invention can be practiced without many of these details. Additionally, some well-known structures or functions may not be shown or described in detail, to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Figure 1:
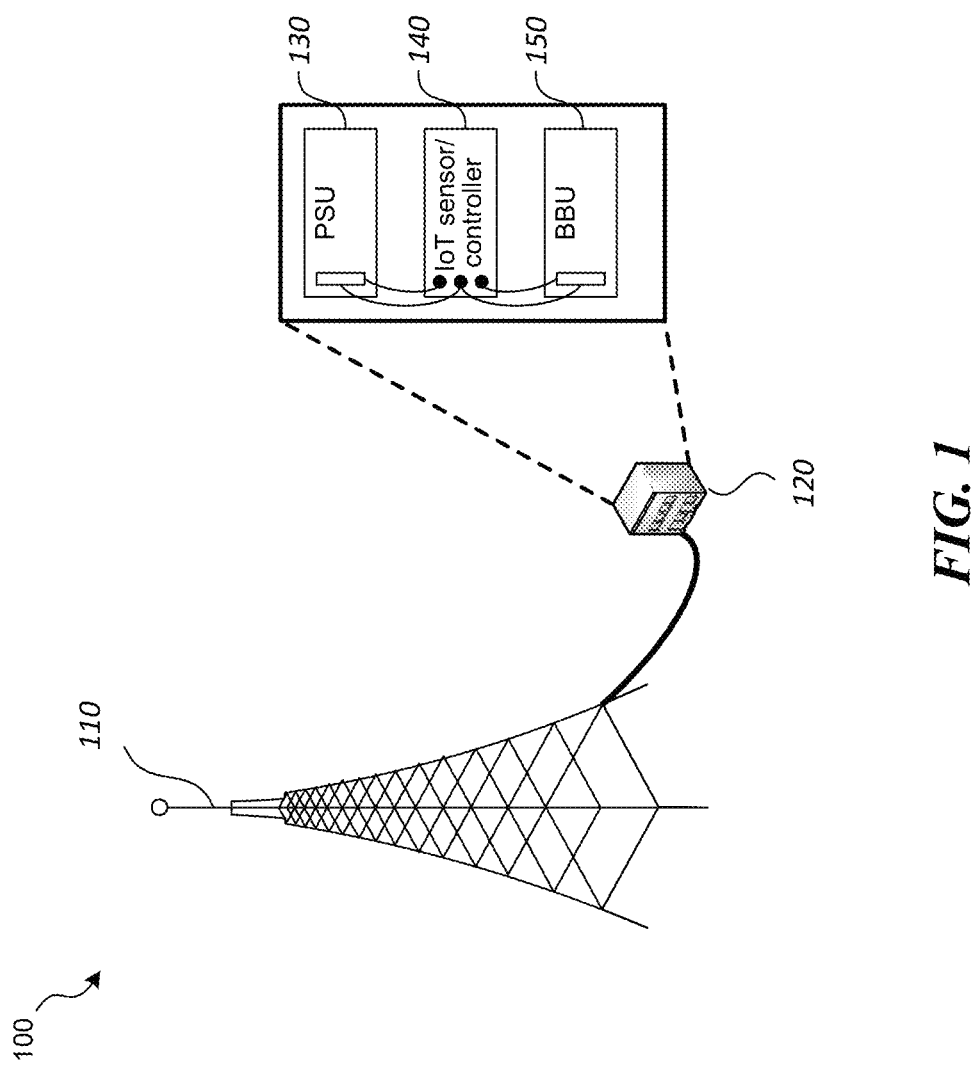
FIG. 1 is an illustration of a representative cell site that can be monitored and controlled by a sleeping cell IoT sensor/controller.

FIG. 1 is an illustration of representative cell site 100 that can be monitored and controlled by a sleeping cell IoT sensor/controller 140. Cell site 100 can include base station radios and antennas (collectively the cell) 110 and base station baseband unit (BBU) 120. For example, for 4G LTE E-UTRAN radio access networks, cell site 100 can include an eNodeB including remote radio units (RRUs) (part of radios and antennas 110) coupled to an LTE BBU (BBU 120) through power cable (not shown in FIG. 1). BBU 120 includes a power supply unit (PSU) 130 and a baseband module 150. The power supply unit 130 provides power to the baseband module 150 based on a configuration of an IoT sensor/controller 140 (for example, based on a toggle switch setting of an I/O interface of the IoT sensor/controller 140).

The IoT sensor/controller 140 is a cellular device compatible with the radio access technology (RAT) of cell site 100 and configured to communicate with a remote server/host through the cell 110. For example, IoT sensor/controller 140 can be a UTRAN/UMTS, Evolved Universal Mobile Telecommunications System (UMTS) Terrestrial Radio Access Network (EUTRAN)/Long Term Evolution (LTE), 5G New Radio (NR), narrowband IoT (NB-IoT), LTE Category M (LTE-M) device or other low-power wide area (LPWA) IoT, machine-type-communication (MTC) or Machine-to-Machine (M2M) device. Additionally, IoT sensor/controller 140 is compatible with cell 110 and can support the frequency bands and duplex configuration (e.g., FDD/TDD modes) broadcast by cell 110. As will be described further below, the IoT sensor/controller 140 can be configured to interrupt power to the baseband module 150 when it is unable to communicate with the remote server/host via cell 110. Interrupting power to baseband module 150 resets or power-cycles BBU 120 enabling the BBU to recover from a sleeping cell failure. Resetting the BBU (e.g., temporarily disconnecting the BBU from the PSU to interrupt power to the BBU) restarts the entire system allowing for recovery of sleeping cell failures caused by remote radio units or remote radio heads (RRU/RRH).

Figure 2:
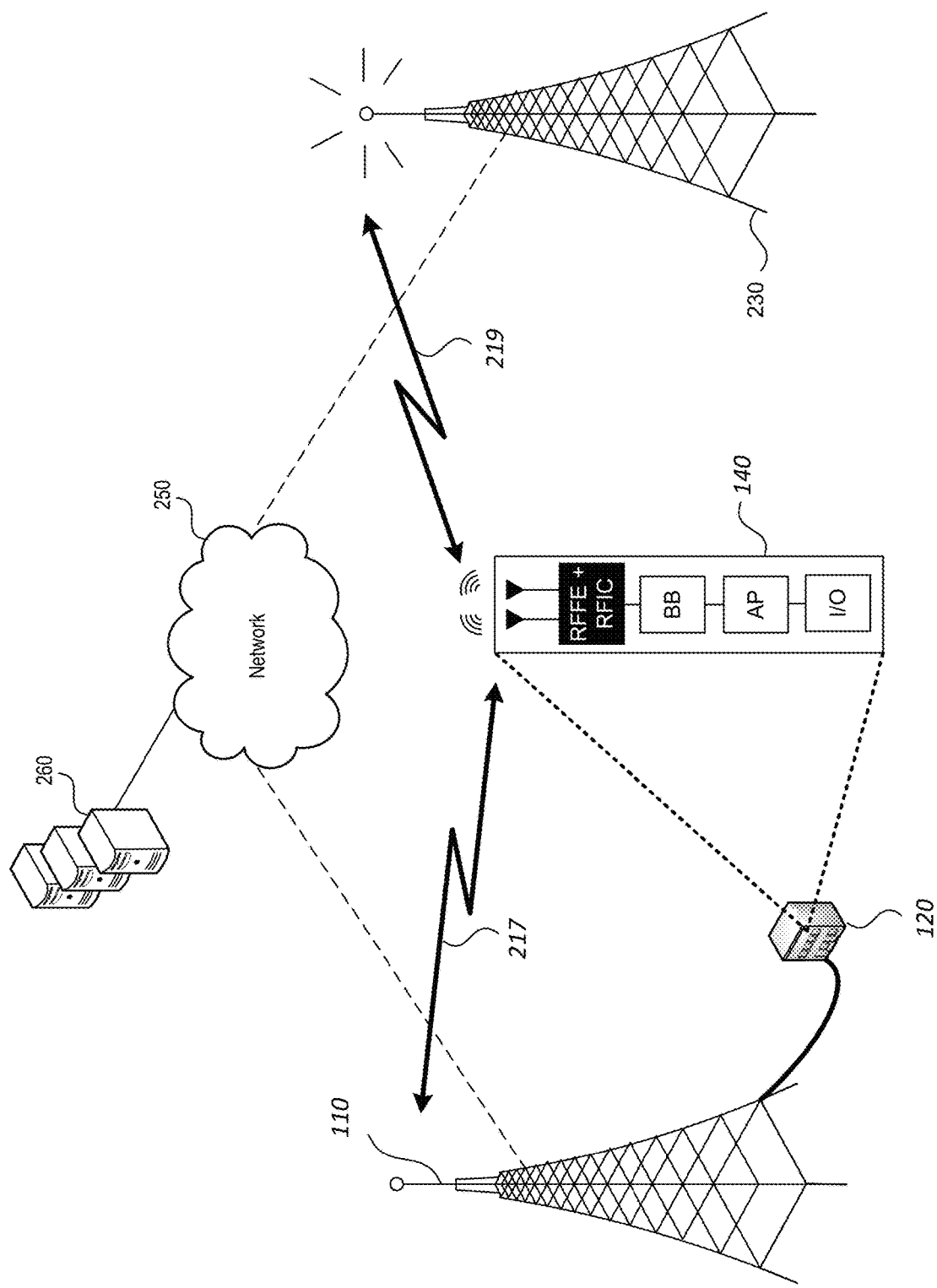
FIG. 2 is an illustration of a representative sleeping cell IoT sensor/controller coupled to a remote server/host via a monitored cell.

FIG. 2 is an illustration of representative sleeping cell IoT sensor/controller 140 coupled to a remote server/host 260 via a monitored cell 110. IoT sensor/controller 140 communicates with remote server/host 260 through a network 250 by transmitting/receiving wireless signals 217. IoT sensor/controller 140 can also communicate with remote server/host 260 through network 250 by transmitting/receiving wireless signals 219 to backup cell 230. IoT sensor/controller 140 is compatible with the radio access technology (RAT) of the monitored cell 110 and the backup cell 230 and can synchronize and authenticate to network 250 through the monitored cell and backup cell. For example, backup cell 230 can belong to the same network operator as the monitored cell 110 or otherwise be available for roaming or monitored cell 110 and backup cell 230 can broadcast on frequency bands compatible with IoT sensor/controller 140. IoT sensor/controller 140 is preferably a low-cost device (to allow for economical deployment in most or all of the cell sites), a low power device (providing long battery life, e.g., greater than 5 years, where the IoT sensor/controller 140 is battery-powered), and capable of wide/enhanced coverage (e.g., compatible with LTE coverage enhanced (CE) modes) to allow IoT sensor/controller 140 to synchronize with far away backup cells (e.g., backup cell 230). As will be discussed below, the ability to communicate with distant cells can allow IoT sensor/controller 140 to receive configuration updates from a cell that is not affected by a geographically localized sleeping cell problem.

Figure 3:
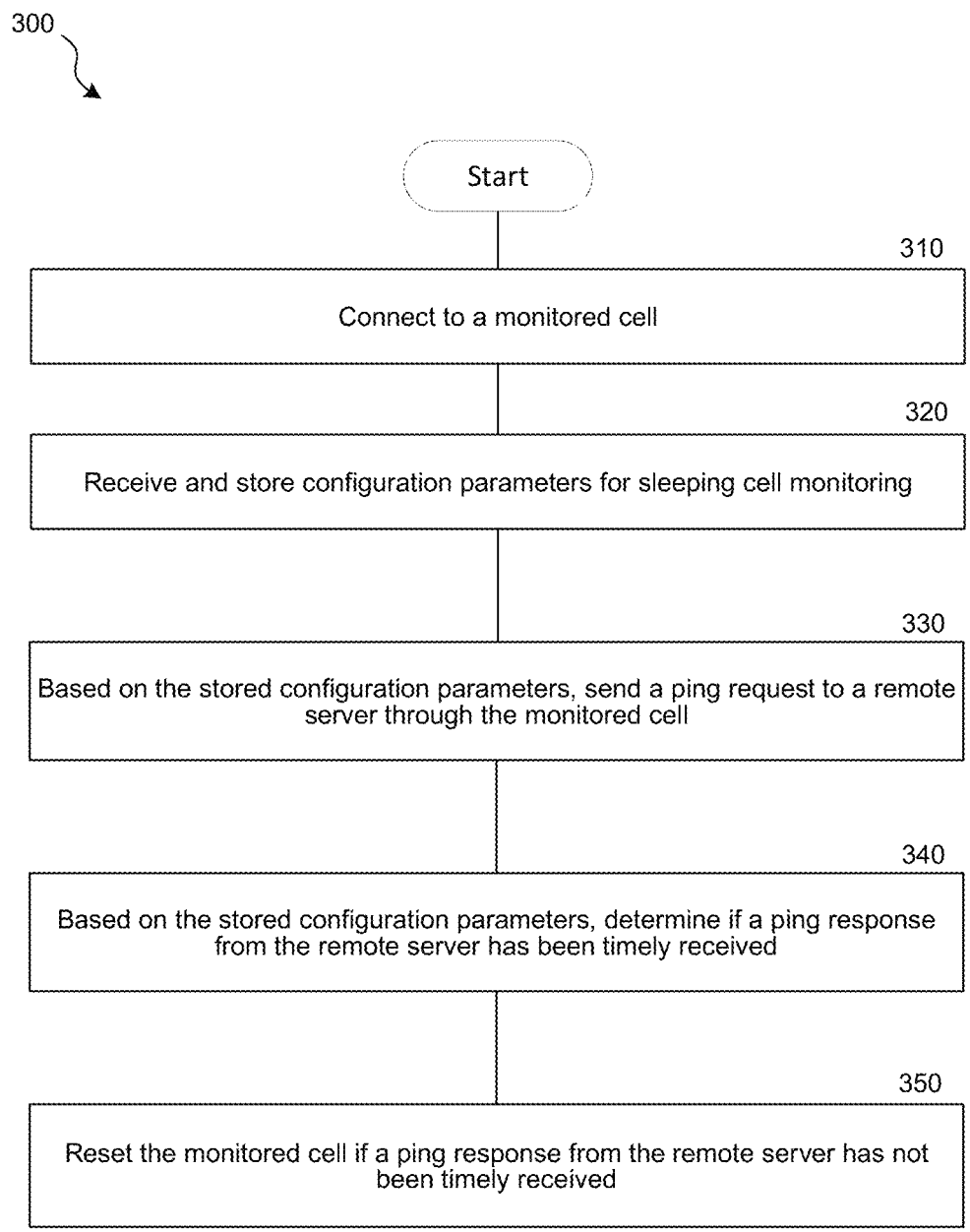
FIG. 3 is a representative flow diagram illustrating a method for recovering from a sleeping cell failure.

FIG. 3 is a representative flow diagram 300 illustrating a method for resetting a cell or base station (e.g., LTE eNB or 5G NR gNB). At block 310, IoT sensor/controller 140 connects to (or initiates a connection request to attempt to connect to) a cell to be monitored for sleeping cell failures. For an LTE (LTE-M, NB-IoT) solution, IoT sensor/controller 140 synchronizes to the primary/secondary synchronization signals, performs random access procedures, and sends a connection request to monitored cell 110 (e.g., attempts to authenticate to the network of monitored cell 110 and requests uplink grants). If IoT sensor/controller 140 is unable to connect to monitored cell 110, it could mean that monitored cell 110 is already undergoing a sleeping cell failure (e.g., RACH failure described above). IoT sensor/controller 140 can then attempt to connect to a backup cell (e.g., backup cell 230). If the connection to backup cell 230 (FIG. 2) is successful but the connection to the monitored cell 110 was unsuccessful, IoT sensor/controller 140 can make additional attempts to connect to the monitored cell 110 according to pre-configured settings (e.g., attempts a pre-configured number of times, with a pre-configured delay between each successive access attempt or with a preconfigured periodicity of access attempts). The pre-configured settings can be obtained from the backup cell 230 (or another cell that the IoT sensor/controller can connect to). Alternatively or additionally, the preconfigured settings can be stored in IoT sensor/controller 140, where the settings can be manually loaded into the sensor's memory or can be downloaded from the monitored cell during the last successful connection attempt.

If IoT sensor/controller 140 cannot establish communication with monitored cell 110 (but can establish communication with other cells), it can reset the monitored cell 110 at block 350 (discussed further below). However, if IoT sensor/controller 140 establishes communication with monitored cell 110, the IoT sensor/controller, at block 320, receives and stores configuration parameters for sleeping cell monitoring. Examples of such configuration parameters for various embodiments are described below in relation to FIG. 4.

At block 330, based on the multiple stored configuration parameters, IoT sensor/controller 140 can send or initiate a ping request to remote server/host 260 in network 250 (shown in FIG. 2) through the monitored cell 110. That is, IoT sensor/controller 140 wirelessly communicates through monitored cell 110's radio access network (e.g., via wireless signals 217) to ping the remote server/host 260 through network 250. As discussed below regarding FIG. 4, the stored configuration parameters can determine the identity of the remote server/host to ping (e.g., the IP address or domain name of remote server/host 260), how frequently to send the pings, etc.

At block 340, after sending the ping at block 330, IoT sensor/controller 140 determines if a ping response was received and if the ping response meets the conditions indicated in the parameters stored at block 320. Examples of such conditions are whether the ping response was received in a timely fashion, whether the measured round-trip time (RTT) is below a configured RTT threshold value, if a packet loss rate is below a configured threshold, etc.

At block 350, if the ping response was not timely received (or the ping response did not meet the properties in the stored configurations), IoT sensor/controller 140 (FIG. 1) can determine that the monitored cell 110 is undergoing a sleeping cell problem. Consequently, IoT sensor/controller 140 can reset the monitored cell 110, e.g., by toggling a relay coupling the power supply unit 130 and baseband module 150 to power cycle the baseband unit 120. While described as "ping" requests and responses to/from the remote server/host 260 (FIG. 2), other well-known methods to test the reachability of the remote server/host 260 can be used in lieu of sending Internet Control Message Protocol (ICMP) echo request packets and waiting for ICMP echo replies as in the case of pings. Any technique that allows IoT sensor/controller 140 determine the reachability of the server/host 260 can be used to determine that the connection through monitored cell 110 is alive and thus monitored cell 110 is not in a sleeping cell state. In some embodiments, for example in a centralized/cloud-radio access network (RAN) (C-RAN) architecture, IoT sensor/controller 140 can reset the monitored cell 110 by resetting a baseband unit (BBU) unit in the C-RAN BBU pool corresponding to a remote radio unit/remote radio head (RRU/RRH) of the monitored cell 110. In some embodiments, the IoT sensor/controller 140 is locked to the targeted cell based on the reference signal received power (RSRP) value which is highest from the monitored cell 110 (e.g., when IoT sensor/controller is installed close to the monitored cell 110).

In some embodiments, when operation and maintenance (OAM) systems fail, connectivity to the monitored cell 110 via operation support systems (OSS) or other cell monitoring system is lost although the monitored cell 110 can still handle cell traffic. For example, after a software upgrade to the cell site or because of a misconfiguration of a cell site router/switch, the management plane IP connectivity can be lost thereby removing cell visibility even though the cell is still functional. Under this scenario, the IoT sensor/controller 140 still has connectivity to the remote server/host 260 via the monitored cell 110. Therefore, the IoT sensor/controller 140 can be remotely activated to manually toggle the relay switch connected to the IoT device (e.g., toggle the relay switch coupling the power supply unit 130 and baseband module 150 to power cycle the baseband unit 120). Remotely toggling the relay switch will trigger a cell site reset and restore the management plane and monitoring to the cell site thereby avoiding a costly truck roll to the cell site. And if the cell is not taking traffic, the sleepy cell recovery mechanism can kick in to recover the site. In some embodiments, as described further below in relation to FIG. 5, the IoT sensor/controller 140 can include a second SIM associated with a separate network operator's network (or the IoT sensor/controller 140 can otherwise operate on a second separate network) and the remote reset can be activated through that separate network. This can allow the IoT sensor/controller 140 to manually trigger a reset of the base station or cell through the separate network even when the monitored cell 100 is in a sleeping cell state (when that separate network is active/online).

Figure 4:
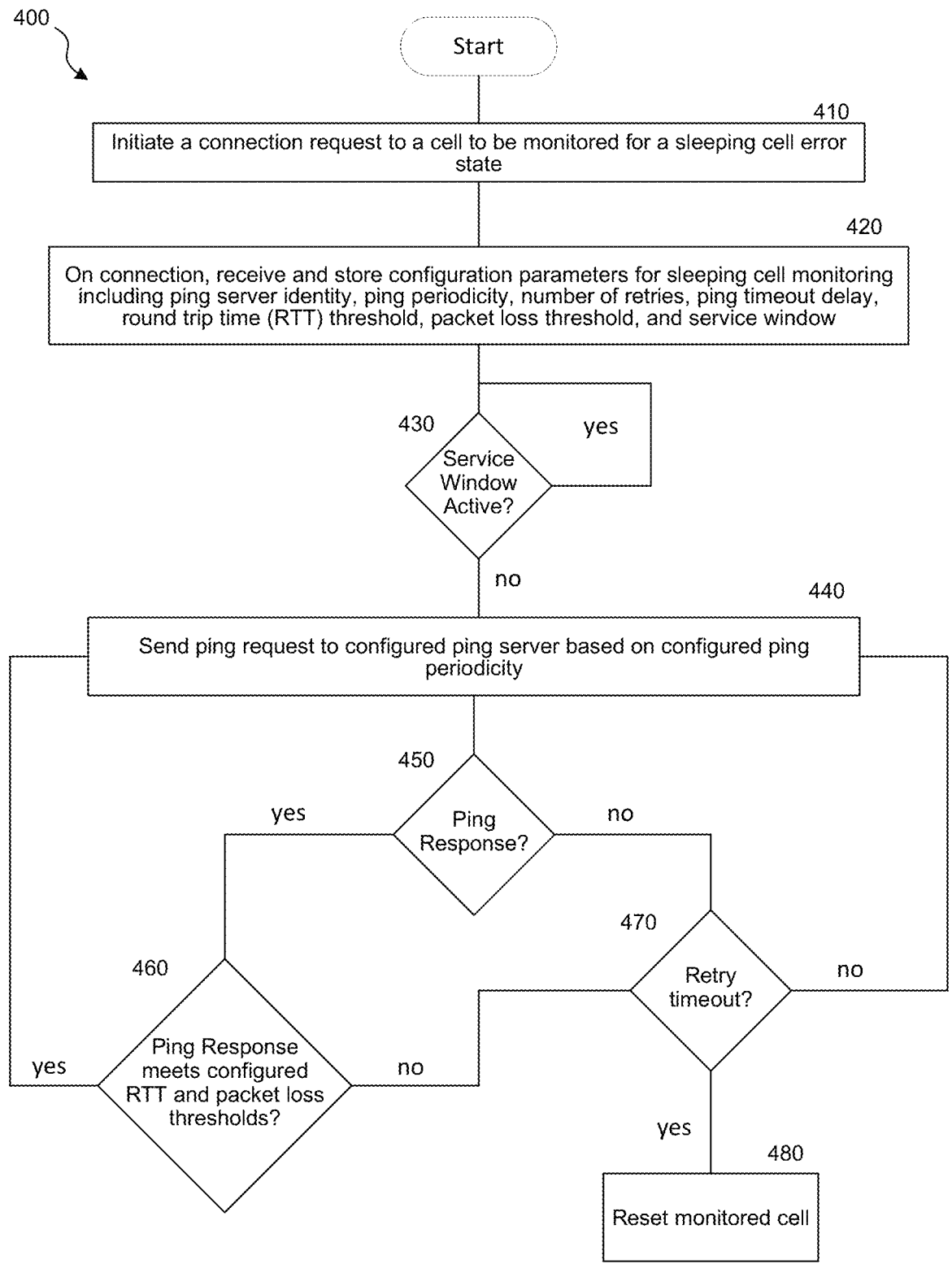
FIG. 4 is a representative flow diagram illustrating another method for recovering from a sleeping cell failure.

FIG. 4 is a representative flow diagram 400 illustrating a method for resetting a cell according to another embodiment. At block 410, IoT sensor/controller 140 initiates a connection or communication request to a cell to be monitored (i.e., attempts to connect to monitored cell 110). As described above, the inability to connect to the monitored cell 110 can indicate that the cell is in a sleeping cell condition that requires a reset in certain situations (e.g., after several failed connection attempts following additional connection requests or after successful connection to another cell such as backup cell 230).

After successfully connecting to the monitored cell 110, IoT sensor/controller 140, in block 420, receives and stores configuration parameters for use in monitoring and controlling the monitored cell 110 with respect to sleeping cell problems. IoT sensor/controller 140 can download configuration settings using a different cell such as backup cell 230 where the configuration settings can be used to inform subsequent connection attempts to monitored cell 110 (the configuration parameters can also be manually loaded into the IoT sensor/controller 140). IoT sensor/controller can receive and store different configuration parameters, for example, the identity of remote servers/hosts to ping, IP addresses or domain names of remote servers/hosts configured to receive and respond to ping requests, cell identity to camp on and monitor, backup cell identity, radio access technology to use, roaming restrictions etc. Alternatively, or additionally, IoT sensor/controller 140 can receive/store configuration parameters related to heartbeat signal monitoring of the monitored cell 110 (e.g., ping requests to remote server/host 260). Such configuration parameters include, for example, the periodicity of the ping requests, the ping timeout delay value (how long to wait for a ping response before concluding that remote host 260 is unreachable), and round trip time (RTT) and packet loss thresholds (e.g., RTT and packet loss values which, if exceeded, IoT sensor/controller 140 can conclude that monitored cell 110's performance is degraded). In some embodiments, if backup cell 230 is unreachable (e.g., offline or in a sleeping cell failure) the IoT sensor/controller 140 can attempt to reach a secondary backup cell. The backup cell 230 can also include an IoT sensor/controller to allow it to recover from potential a sleeping cell error state.

Other configuration parameters can include ones related to service windows and other blackout/offline time windows, i.e. times when IoT sensor/controller 140 need not monitor the monitored cell 110 (e.g., need not send ping requests to remote server/host 260 or should ignore lack of ping responses or untimely ping responses). The IoT sensor/controller 140 can enter a sleep/low-power or standby mode (e.g., a discontinuous reception (DRX) or extended DRX inactive window or an energy/power saving mode). For example, window configuration parameters could indicate:

time when service or maintance of the cell is to occur (and thus when the cell will be offline and unable to facilitate communication with a remote server);

time after service of the cell when monitoring should be suspended (e.g., a programmable/configurable delay following a firmware update reset to give time for the cell to come back online);

time after resetting the cell (as described in relation to block 480 below) when monitoring should be suspended until the cell is back online (in some embodiments, this can be further limited based on the number of previous cell resets per period of time to prevent repeated cell resets);

or other periods when the cell is being taken offline (e.g., is going into an energy saving mode).

At block 430, IoT sensor/controller 140 determines if such a service window is active. If a service window is active, IoT sensor/controller 140 does nothing (loops at block 430 waiting for completion of a service window or another blackout/blanking window to expire). If a service window is not active, IoT sensor/controller 140 attempts to communicate with remote server/host 260 using the monitored cell 110 based on the configuration parameters received and stored in block 420. For example, IoT sensor/controller 140 can send a ping request to the stored IP address or domain name of remote server/host 260, based on the ping periodicity stored in IoT sensor/controller 140. In some embodiments, the IoT sensor/controller 140 receives a time table for maintenance service windows in the configuration parameters received and stored at block 420. In some embodiments, the maintenance service window includes different recovery times for different types of cell site maintenance (i.e., different programmed delays to suspend monitoring for different types of service windows).

At block 440 IoT sensor/controller 440 determines if remote server/host 260 has sent a ping response. If remote server/host 260 has responded to the ping request with a ping response, sensor/controller 140 determines, at block 460, if the ping response meets the properties/parameters stored in block 420. For example, sensor/controller 140 determines whether IoT sensor/controller 140 received the ping response at less than a threshold time after the IoT sensor/controller sent the ping request in block 440, or whether the reported round trip and packet loss rate is below configured thresholds. If the received ping response meets the configured properties (or if no properties are configured for the expected ping response), IoT sensor/controller 140's monitoring function returns to block 440 to send the next ping request per the configured ping periodicity. If, on the other hand, in block 450 IoT sensor/controller 140 does not receive a ping response after waiting a configured ping timeout delay, or in block 460 receives a ping response that does not meet configured settings, IoT sensor/controller 140 determines in block 470 if a retry timeout has been reached. In some embodiments, to determine if a ping response has been received at block 450, the IoT sensor/controller 140 can compare the elapsed time since sending a ping request with a ping timeout delay value stored in the configuration register (i.e., the IoT sensor controller 140 can conclude that a response from the remote server was not successfully received if an elapsed time since sending the request to the remote server exceeds the timeout delay value).

If the retry timeout has not been reached, IoT sensor/controller 140 retries to reach the remote server/host by resending the ping request in block 440 according to configured settings. The retry timeout value, which is received and stored by IoT sensor/controller 140 in block 420, determines the number of times after which failed attempts to reach remote server/host 260 via monitored cell 110 will indicate to the IoT sensor/controller that monitored cell 110 is offline and thus likely in a sleeping cell state. Hence, if in block 470 IoT sensor/controller 140 determines that a retry timeout has been reached (i.e., did not receive a response or received defective responses after so many retries), the IoT sensor/controller resets the monitored cell in block 480. As discussed above, resetting the monitored cell can include power-cycling the baseband unit (BBU) (e.g., BBU 120) or otherwise rebooting the BBU or radio units of the monitored cell to recover from the sleeping cell locked state. Automatically resetting the cell in block 480 results in less user impact because sleepy cell recovery time is reduced particularly where, for example, the retry timeout value in block 470 is just long enough to ensure no inadvertent resets (for temporary network connectivity or host-unreachability instances) but not too long to further delay resets for valid sleeping cell conditions. In some embodiments, the IoT sensor/controller 140 can use the ping response statistics to determine and reset sleeping cell errors that can cause cell degradation but without a complete cell failure. In some embodiments, the IoT sensor/controller 140 can create an error log and/or send an error report to a remote server or host to indicate that a cell reset occurred.

In some embodiments, IoT sensor/controller 140 can use additional performance metrics and KPIs of the monitored cell 110 and neighbor cells (e.g., backup cell 230) to determine if the monitored cell 110 is indeed in a sleeping cell state or to trigger action other than a reset of the monitored cell. For example, IoT sensor/controller 140 can use active alarms, state of counters, KPIs, reports, etc. from the affected cell/eNB, neighbor cells/eNBs, or access gateways, along with other OSS system statistics to distinguish other cell outages/degradations from sleeping cell outage or performance degradation and respond accordingly based on the root cause of the outage/degradation.

The described automated fault detection, diagnosis, and recovery can be part of a self-organizing/self-optimizing network (SON) paradigm. For example, IoT sensor/controller 140 can support the self-configuration of the cell site 100 by configuring itself to monitor cell 110 for sleeping cell problems. IoT sensor/controller 140 supports self-configuration by autonomously connecting to monitored cell 110 and neighbor cells (e.g., backup cell 230), connecting to various remote server/hosts (e.g., remote server/host 260) for heartbeat monitoring, etc. IoT sensor/controller 140 can also support the self-optimization of cell site 100 by, for example, optimizing ping retries or ping response timeout delays that affect the delay between onset of sleeping cell problem and recovery. For example, IoT sensor/controller 140 can learn optimal configuration settings after some time and adapt to use these optimal values to minimize downtime while minimizing the probability of inadvertent or premature cell resets. IoT sensor/controller 140 can also support self-healing of cell site 100, for example, by automatically resetting monitored cell 110 as described above in relation to block 480 of FIG. 4. Because sleeping cell conditions are hard to promptly detect with conventional quality and performance management (QPM) solutions, the use of SON anomaly detection and self-healing functions described in relation to flow 400, allows for the rapid recovery from such partial or complete degradation of network performance. The present system therefore enhances the user quality of experience, for example, by avoiding the degradation of VoLTE dropped call rate (DCR) that would result in customer/subscriber complaints and dissatisfaction.

Figure 5:
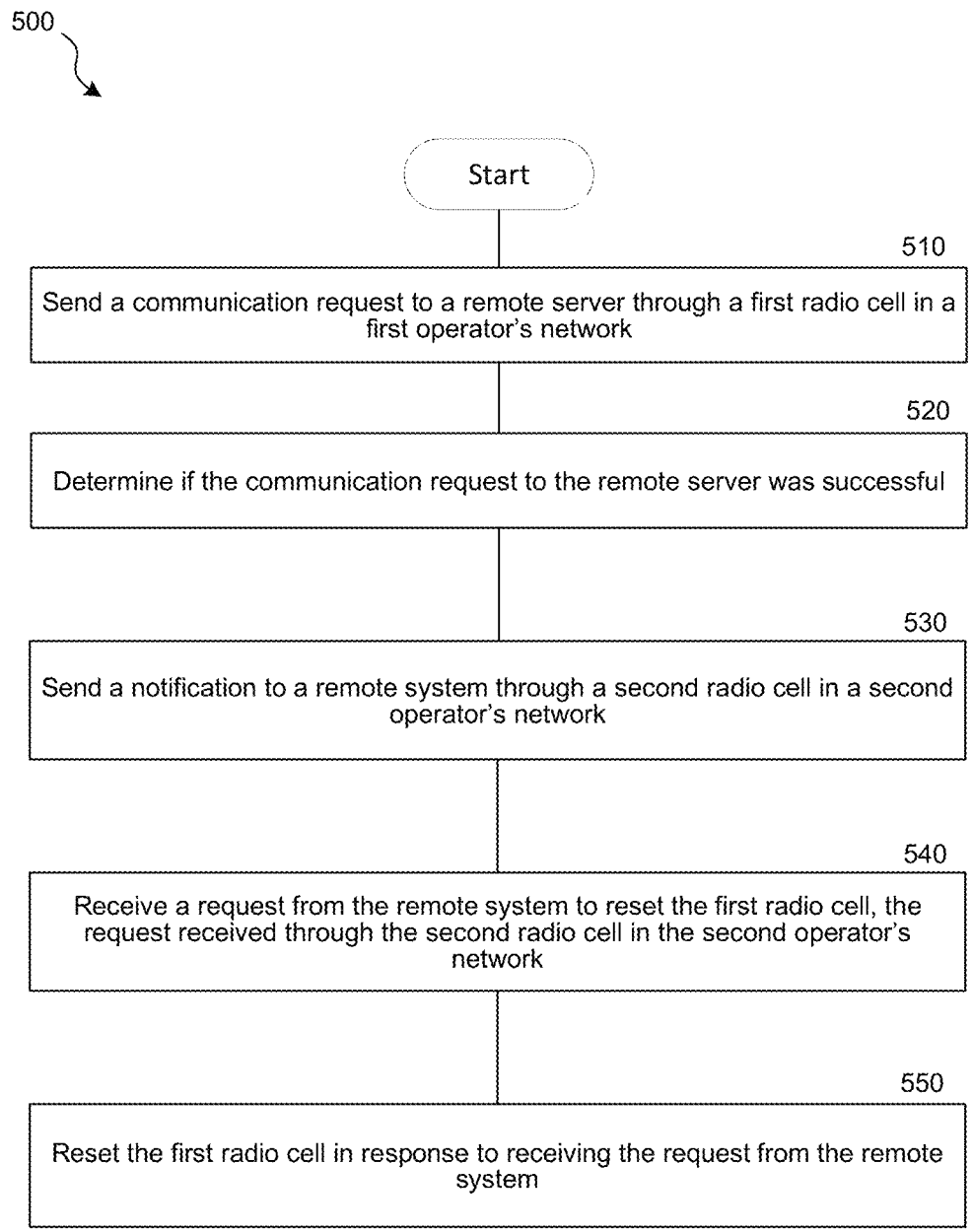
FIG. 5 is a representative flow diagram illustrating a method of base station manual recovery.

FIG. 5 is a representative flow diagram illustrating a method of base station manual recovery. At block 510, a hardware apparatus (e.g., an IoT module with two subscriber identify modules (SIM) (e.g., dual-SIM LTE/NR device), or a multi-SIM IoT module, capable of communicating with multiple cellular radio cells in multiple operators' networks) sends a communication request to a remote server through a first radio cell in a first network operator's network. For example, the multi-SIM IoT module sends a ping request to remote server/host 260 through the monitored cell 110 in a first operator's network (e.g., the network operate responsible for deploying the IoT module).

At block 520 the IoT module determines if the communication request to the remote server/host 260 was successful (e.g., the IoT module determines if it has received a proper ping response from the remote server/host 260). The IoT module is configured to monitor the ping response through the first radio cell in the first operator's network (e.g., the cell to be monitored for a sleeping cell failure state).

If the IoT module determines that the ping response was not successfully received, it sends a notification at block 530 to a remote system (e.g., an operations support system/business support system (OSS/BSS)). In some embodiments, the IoT module can operate on two or more separate radio networks and the IoT module sends the notification to the OSS/BSS system through a second radio cell in a second operator's network (or on a second network for the first operator). For example, the IoT module can include two or more SIMs to connect to two or more cellular LTE or 5G NR networks. Additionally or alternatively, the IoT module can communicate on licensed and unlicensed networks (e.g., LTE/5G and on Wi-Fi/WLAN networks), and can concurrently communicate to the multiple networks (e.g., maintain multiple simultaneous connections via separate radio channels). In some embodiments, the IoT module switches communication from the first operator's network to the second operator's network or from a first wireless network to a second wireless network (e.g., from cellular to Wi-Fi) to send the notification when the IoT module determines that a ping response was not successfully received from the remote server/host 260 via the first operator's network or via the first wireless network.

In the multi-SIM case, the first operator's network associated with a first SIM is separate from the second operator's network associated with a second SIM. Similarly, in the unlicensed/Wi-Fi offload case (i.e., in the case where the IoT module fails over or switches traffic to an unlicensed network such as a WLAN network), the first wireless network (the wireless network through which the ping request is sent (block 510) and ping response is monitored (block 520)) is separate from the second wireless network (the wireless network through which the notification is sent to the remote system (block 530)). This separation of networks ensures that the IoT module can communicate with the remote system even when the first radio cell is down (e.g., when the first radio cell is in a sleeping cell state, but the second radio cell or the second wireless network is operational). For example, ensuring that the second operator is preferably not a virtual network operator operating the same network and the same radio cells as the first operator will result in a higher probability that the second radio cell or the second wireless network is operational even when the first radio cell or first wireless network (e.g., base station, eNB, gNB, Wireless Access Point, etc.) is down. In some embodiments, the first and second cell or first and second network can be operated by the same network operator. For example, the first cell/network can be generated by a network operator's LTE eNB or 5G NR gNB and the second cell/network can be generated by a Wi-Fi access point (AP) operated by or leased to the same network operator. Additionally or alternatively the second cell/network can be generated by a 3G UMTS/WCDMA NodeB operated by the same operator. It will be appreciated that two cells/networks have been used merely as an example and the disclosed technology is not limited to only two levels or redundancy or failover (e.g., a three-SIM IoT module or IoT module capable of operating on three or more SIM-based or non-SIM-based networks can be used to send the notification through a third network in block 530 and receive a request to reset the base station or cell as will be described later in relation to block 540). Furthermore, the alternative networks in which the IoT module can operate can include non-SIM, non-wireless networks (e.g., copper or fiber backhaul links).

At block 540, the remote system sends a request to the IoT module to reset the first radio cell. The remote system sends the request through the second radio cell in the second operator's network (or through the second separate wireless network). The IoT module resets the first radio cell at block 550 in response to receiving the request to reset the first radio cell at block 540. For example, the IoT module toggles a relay switch interrupting power to a baseband unit (BBU) of the first radio cell (e.g., power cycling the base station or eNB/gNB). That is, the resetting of the first radio cell at block 550 is performed by the IoT module or other hardware apparatus capable of communicating on a second wireless network when a first wireless network is down, where the first radio cell is part of the first wireless network. The IoT module sends the notification to the remote system at block 530 by utilizing the second wireless network, and receives the request from the remote system to reset the radio cell at block 540 also via the second wireless network. The first wireless network is separate from the second wireless network (e.g., separate cellular LTE/NR networks or first wireless network is cellular and second wireless network is unlicensed Wi-Fi/WLAN).

Although the above description is focused on resetting a radio cell or base station in response to detecting that the radio cell or base station is in a failure state, a remote system or remote users can reset the radio cell or base station for any other reason. This remote reset can be received through the first radio cell in the first operator's network or through the first wireless network (if the first radio cell or the first wireless network is active as described in relation to FIG. 3 above). Additionally or alternatively, the remote reset can be received through the second radio cell in the second operator's network or through the second wireless network (e.g., if the first radio cell or the first wireless network is down). In some embodiments, this remote reset can be automatically programmed to occur upon detecting that the first radio cell or the first wireless network is down (e.g., the IoT module can be configured to automatically reset the cell or base station as described in relation to FIG. 4 above, or the remote system can be programmed to automatically send the request in block 540).

Remarks

The Figures and above description provide a brief, general description of a suitable environment in which the invention can be implemented. Although not required, aspects of the invention can be implemented in the general context of computer-executable instructions, such as routines executed by a general-purpose data processing device, e.g., a server computer, wireless device or personal computer. Those skilled in the relevant art will appreciate that aspects of the invention can be practiced with other communications, data processing, or computer system configurations. The terms "computer," "server," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device or single computer, the invention can also be practiced in distributed environments where functions or modules are shared among disparate processing devices, which are linked through a communications network, such as a Local Area Network (LAN), Wide Area Network (WAN), or the Internet. In a distributed computing environment, program modules can be in both local and remote memory storage devices. Aspects of the invention can be stored or distributed on tangible computer-readable media, including magnetically or optically readable computer discs, hard-wired or preprogrammed chips (e.g., EEPROM semiconductor chips), nanotechnology memory, biological memory, or other data storage media.

Unless the context clearly requires otherwise, throughout the description and the claims, the words "comprise," "comprising," and the like are to be construed in an inclusive sense, as opposed to an exclusive or exhaustive sense; in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations can perform routines having steps/blocks, or employ systems having blocks, in a different order, and some processes or blocks can be deleted, moved, added, subdivided, combined, or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further any specific numbers noted herein are only examples: alternative implementations can employ differing values or ranges.

The teachings of the invention provided herein can be applied to other systems, not necessarily the system described above. The elements and acts of the various examples described above can be combined to provide further implementations of the invention. Some alternative implementations of the invention can include not only additional elements to those implementations noted above, but also can include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. When statements or subject matter in an incorporated by reference conflict with statements or subject matter of this application, then this application shall control.

These and other changes can be made to the invention in light of the above Detailed Description. While the above description describes certain examples of the invention, and describes the best mode contemplated, no matter how detailed the above appears in text, the invention can be practiced in many ways. Details of the system can vary considerably in its specific implementation, while still being encompassed by the invention disclosed herein. As noted above, terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, certain aspects of the disclosed system be embodied as a means-plus-function claim, or in other forms, such as being embodied in a computer-readable medium. (Any claims intended to be treated under 35 U.S.C. § 112(f) will begin with the words "means for" but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

I claim:

1. At least one non-transitory computer-readable medium storing instructions that, when executed by a processor in an Internet of Things (IoT) module, cause the IoT module to perform a method of recovering from sleeping cell failure, the method comprising:
  initiating a connection request to a cellular radio cell;
  receiving and storing configuration parameters for monitoring the cellular radio cell for sleeping cell failure when the connection request to the cellular radio cell is successful;
  sending a request to a remote server,
    wherein the request to the remote server is a ping request sent through the cellular radio cell, and
    the ping request is based on the stored configuration parameters;
  determining, based on the stored configuration parameters, if a response from the remote server was successfully received,
    wherein the response from the remote server is a ping response;
  resetting the cellular radio cell in response to determining that a response from the remote server was not successfully received,
    wherein the resetting of the radio cell is performed by the IoT module temporarily disconnecting a baseband unit (BBU) of the cellular radio cell from a power supply unit (PSU of the cellular radio cell.

2. The computer-readable medium of claim 1, wherein initiating the connection request to the cellular radio cell further comprises:
  sending a connection request to a first radio cell,
    wherein the first radio cell is a radio cell to be monitored for sleeping cell failure;
  determining whether the connection request to the first radio cell was successful;
  sending a connection request to a second radio cell in response to determining that the connection request to the first radio cell was not successful;
  receiving and storing configuration parameters from the second radio cell when the connection request to the second radio cell is successful;
  resending one or more additional connection requests to the first radio cell,
    wherein the number of additional connection requests is based on the stored configuration parameters, and
    wherein a periodicity of the additional connection requests is based on the stored configuration parameters; and
  resetting the cellular radio cell in response to determining the one or more additional connection requests to the first radio cell was not successful.

3. The computer-readable medium of claim 1, wherein the IoT module is based on Long Term Evolution (LTE) Category M (LTE-M) or narrowband IoT (NB-IoT), wherein the IoT module is a battery-powered module and is compatible with LTE coverage enhanced (CE) modes.

4. The computer-readable medium of claim 1, wherein resetting the radio cell in response to determining that a response from the remote server was not successfully received further comprises determining that quality and performance metrics of the radio cell do not indicate outage or performance degradation of the radio cell.

5. The computer-readable medium of claim 1, wherein determining that the response from the remote server was not successfully received comprises comparing an elapsed time since sending the request to the remote server with a timeout delay value in the stored configuration parameters.

6. The computer-readable medium of claim 1, further comprising:
  sending a notification to a remote system in response to determining that a response from the remote server was not successfully received;

receiving a request to reset the cellular radio cell from the remote system; and resetting the cellular radio cell in response to receiving the request.

7. The computer-readable medium of claim 6, wherein the cellular radio cell is a radio cell to be monitored for sleeping cell failure, sending the request to the remote server is through the radio cell to be monitored, sending the request to the remote server utilizes a first operator's network, sending the notification to the remote system utilizes a second operator's network, and receiving the request to reset the cellular radio cell utilizes the second operator's network.

8. The computer-readable medium of claim 6, wherein the IoT module is a dual-SIM Long Term Evolution (LTE) or 5G New Radio (NR) hardware apparatus.

9. A method for recovering from a sleeping cell error state of a radio cell, the method comprising:
  initiating a connection request to a first radio cell,
    wherein the first radio cell is a radio cell to be monitored for a sleeping cell error state;
  sending a communication request to a remote server in response to determining that the connection request to the first radio cell was successful,
    wherein the communication request to the remote server is transmitted through the first radio cell, and
    wherein the communication request to the remote server is based on multiple stored configuration parameters,
    wherein the multiple stored configuration parameters comprises at least two of:
      an identity of the remote server,
      a periodicity for sending communication requests to the remote server,
      a timeout delay for waiting for a response from the remote server,
      a round trip time (RTT) threshold value,
      a packet loss threshold value,
      a value indicating a number of times to attempt to connect to the remote server,
      a value indicating a number of times to attempt to connect to the first radio cell, or
      a time window to suspend monitoring of the first radio cell; and
  determining, based on the multiple stored configuration parameters, whether a response from the remote server has been successfully received.

10. The method of claim 9, further comprising:
  resetting the first radio cell in response to determining that a response from the remote server has not been successfully received.

11. The method of claim 9, further comprising:
  sending a connection request to a second radio cell in response to determining that the connection request to the first radio cell was not successful;
  sending one or more additional connection requests to one or more additional radio cells in response to determining that the connection request to the second radio cell was not successful;
  resending one or more additional connection requests to the first radio cell,
    wherein resending the one or more additional connection requests to the first radio cell is in response to determining that the connection request to the second radio cell or the additional connection requests to the one or more additional radio cell was successful, and
    wherein the number of additional connection requests to the first radio cell and a periodicity of the additional connection requests to the first radio cell is based on the multiple stored configuration parameters; and
  resetting the first radio cell in response to determining that the one or more additional connection requests to the first radio cell was not successful.

12. The method of claim 10, wherein sending the communication request to the remote server and resetting the first radio cell are additionally based on whether the time window to suspend monitoring of the first radio cell has been reached.

13. The method of claim 9, further comprising:
  sending a connection request to a second radio cell in response to determining that the connection request to the first radio cell was not successful;
  sending one or more additional connection requests to one or more additional radio cells in response to determining that the connection request to the second radio cell was not successful;
  resending one or more additional connection requests to the first radio cell,
    wherein the number of additional connection requests to the first radio cell is based on the multiple stored configuration parameters, and
    wherein a periodicity of the additional connection requests to the first radio cell is based on the multiple stored configuration parameters; and
  resetting the first radio cell in response to determining the one or more additional connection requests to the first radio cell was not successful, and wherein the multiple stored configuration parameters are received from the first radio cell, the second radio cell, or the one or more additional radio cells.

14. The method of claim 9, further comprising:
  sending a connection request to a second radio cell in response to determining that the connection request to the first radio cell was not successful;
  sending one or more additional connection requests to one or more additional radio cells in response to determining that the connection request to the second radio cell was not successful;
  resending one or more additional connection requests to the first radio cell,
    wherein the number of additional connection requests to the first radio cell is based on the multiple stored configuration parameters, and
    wherein a periodicity of the additional connection requests to the first radio cell is based on the multiple stored configuration parameters; and
  resetting the first radio cell in response to determining the one or more additional connection requests to the first radio cell was not successful.

15. The method of claim 9, wherein determining whether a response from the remote server has been successfully received further comprises:
  determining whether a response from the remote server has been received after a delay from a time of sending the communication request to the remote server equal to the timeout delay;
  determining whether the response from the remote server meets the RTT threshold value;
  determining whether the response from the remote server meets the packet loss threshold value; and
  determining whether a number of communication request to the remote server that resulted in no response from the remote server, or that resulted in a response from the remote server that did not meet the RTT threshold value, or that resulted in a response from the remote server that did not meet the packet loss threshold value exceed the value indicating a number of times to attempt to connect to the remote server.

16. The method of claim 9, further comprising:
sending a notification to a remote system in response to determining that the response from the remote server was not successfully received;
receiving, from the remote system, a request to reset the first radio cell; and
resetting the first radio cell in response to receiving the request from the remote system,
 wherein the resetting is performed by an Internet of Things (IoT) module.

17. The method of claim 16, wherein sending the notification to the remote system in response to determining that a response from the remote server was not successfully received is through a second radio cell, and receiving, from the remote system, the request to reset the first radio cell is through the second radio cell.

18. The method of claim 17, wherein the first radio cell is a radio cell in a first operator's network, and the second radio cell is a radio cell in a second operator's network, wherein the first operator's network is separate from the second operator's network.

19. The method of claim 18, wherein the IoT module is a multi-SIM Long Term Evolution (LTE) or 5G New Radio (NR) hardware apparatus capable of concurrently connecting to the first radio cell in the first operator's network and the second radio cell in the second operator's network.

20. A system configured to recover from a sleeping cell error state of a radio cell within a wireless network, the system comprising:
at least one processor coupled to the wireless network; and
at least one non-transitory memory, coupled to the at least one processor, and storing instructions for:
 sending a request to a remote server using the radio cell; and
 resetting the radio cell in response to determining that a response from the remote server was not successfully received,
  wherein the resetting is performed by interrupting power to a baseband unit (BBU) of the radio cell, and
 sending the request to the remote server and resetting the radio cell in response to determining that the response from the remote server was not successfully received is based on stored configuration parameters comprising at least two of:
 an identity of the remote server,
 a periodicity for sending communication requests to the remote server,
 a timeout delay for waiting for a response from the remote server,
 a round trio time (RTT) threshold value,
 a packet loss threshold value, a value indicating a number of times to attempt to connect to the remote server,
 a value indicating a number of times to attempt to connect to the radio cell, or
 a time window to suspend monitoring of the radio cell.

21. The system of claim 20, wherein resetting the radio cell in response to determining that the response from the remote server was not successfully received further comprises determining if an elapsed time since sending the request to the remote server exceeds a timeout delay value.

22. The system of claim 20, wherein sending the request to the remote server using the radio cell further comprises determining a periodicity of sending requests to the remote server from one or more stored configuration parameters, determining if a service window of the radio cell is active, and sending a request to the remote server based on the determined periodicity of sending requests if a service window of the radio cell is not active.

23. The system of claim 20, further comprising sending an error report to a remote host to indicate that the radio cell was reset.

24. The system of claim 20, further comprising entering a power saving mode in response to determining that the radio cell is offline, wherein sending the request to the remote server is suspended upon entering the power saving mode.

25. The system of claim 20, wherein resetting the radio cell in response to determining that the response from the remote server was not successfully received further comprises:
 determining that a response from the remote server was not successfully received;
 sending a notification to a remote system in response to determining that a response from the remote server was not successfully received;
 receiving, from the remote system, a request to reset the radio cell in response to sending the notification to the remote system; and,
 resetting the radio cell in response to receiving the request from the remote system.

26. The system of claim 25, wherein the resetting is performed by a hardware apparatus capable of communicating on a second wireless network when a first wireless network is down, the radio cell is part of the first wireless network, sending the notification to the remote system utilizes the second wireless network, and receiving the request from the remote system to reset the radio cell utilizes the second wireless network, and the first wireless network is separate from the second wireless network.

27. The system of claim 26, wherein the resetting is performed by a Long Term Evolution (LTE) or 5G New Radio (NR) IoT module capable of concurrently communicating on the first operator's network and the second operator's network.

28. The system of claim 25, wherein the radio cell is in a first operator's network, sending the notification to the remote system utilizes a separate radio cell in a second operator's network, and receiving the request from the remote system to reset the radio cell utilizes the separate radio cell in the second operator's network, wherein the first operator's network is separate from the second operator's network.

* * * * *